(12) United States Patent (10) Patent No.: US 7,622,840 B2
Yonemori et al. (45) Date of Patent: Nov. 24, 2009

(54) ELECTRIC MACHINE AND METHOD OF USING ELECTRIC MACHINE

(75) Inventors: Kei Yonemori, Hiroshima (JP); Nobuhide Seo, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 545 days.

(21) Appl. No.: 11/458,954

(22) Filed: Jul. 20, 2006

(65) Prior Publication Data

US 2007/0018524 A1 Jan. 25, 2007

(30) Foreign Application Priority Data

Jul. 22, 2005 (JP) ............................. 2005-212431
Jul. 22, 2005 (JP) ............................. 2005-212433

(51) Int. Cl.
*H02K 47/00* (2006.01)
(52) U.S. Cl. ...................................... 310/113; 310/166
(58) Field of Classification Search ......... 310/112–115, 310/166, 168, 171, 209
See application file for complete search history.

(56) References Cited

U.S. PATENT DOCUMENTS

| | | | | |
|---|---|---|---|---|
| 4,482,830 A | * | 11/1984 | Iwaki et al. ................. | 310/113 |
| 4,920,295 A | | 4/1990 | Holden et al. | |
| 5,051,640 A | | 9/1991 | Freise | |
| 6,019,183 A | * | 2/2000 | Shimasaki et al. .......... | 180/165 |
| 6,104,117 A | * | 8/2000 | Nakamura et al. .......... | 310/254 |
| 6,563,246 B1 | | 5/2003 | Kajiura et al. | |
| 6,864,605 B2 | * | 3/2005 | Shimizu et al. ............ | 310/68 R |
| 7,034,422 B2 | * | 4/2006 | Ramu ......................... | 310/114 |
| 7,151,335 B2 | * | 12/2006 | Tajima et al. ............ | 310/156.48 |
| 7,242,128 B2 | * | 7/2007 | Innami et al. ................ | 310/259 |
| 2004/0041485 A1 | | 3/2004 | Horber | |

FOREIGN PATENT DOCUMENTS

JP 2001-25286 A 1/2001
WO WO-94/19855 A1 9/1994

OTHER PUBLICATIONS

European Search Report for EP application 06 01 5260 Feb. 12, 2007.

* cited by examiner

*Primary Examiner*—Thanh-Tam T Le
(74) *Attorney, Agent, or Firm*—Alleman Hall McCoy Russell & Tuttle LLP

(57) ABSTRACT

There is provided a method of using an electric machine. To generate torque, electricity is provided to stator coils on a plurality of salient poles of a stator arranged around a rotor having a plurality of salient poles to pull the rotor salient poles in the circumferential direction. To generate electricity, the method comprises rotating the rotor and generating a magnetic field on a magnetizing member. The magnetizing member is arranged coaxially with the rotor and offset from the rotor in the axial direction. The method further comprise conducting the generated magnetic field to the salient poles of the rotating rotor to induce alternating magnetic flux on the stator coils, and recovering electricity generated by the induced alternating magnetic flux from the stator coils. The generated magnetic field does not change its configuration when the rotor rotates except for distances between the closest pairs of rotor salient poles and stator salient poles.

20 Claims, 9 Drawing Sheets

ELECTRIC MACHINE AND METHOD OF USING ELECTRIC MACHINE

BACKGROUND

The present description relates to an electric machine, more particularly to a switched reluctance motor and method of using it to generate torque and electricity.

A switched reluctance motor is known and presented, for example in Japanese Patent Application Publication 2001-25286, which generates torque on its rotor by sequentially carrying electricity on coils of a plurality of salient poles of a stator by means of switching elements. The electricity sequentially carried on the stator coils generates sequentially a magnetic field on each of the stator salient poles. The magnetic field pulls a salient pole of the rotor to each of the stator salient poles, consequently generating torque.

In an automotive application, such as an electric vehicle and hybrid electric vehicle, the switched reluctance motor may be used to generate electricity. When the rotor rotates, electricity is carried on a stator coil at one of the stator salient poles that is selected as a magnetic field coil, thereby generating magnetic field on the selected stator salient pole. Alternating magnetic flux is induced and passes through the selected stator salient pole, two of the rotor salient poles and one of the unselected stator salient poles. The induced alternating magnetic flux generates electricity on another stator coil (electric generation coil) on that one of the unselected stator salient poles.

However, in this method, the induced magnetic flux is shaped in a plane perpendicular to the rotational shaft. Consequently, the distance between the magnetic field coil and the electric generation coil on the stator changes as the rotor rotates. As a result, the amplitude of generated electricity is altered, thereby causing noise in the generated electricity. This may decrease efficiency of electric generation.

The inventors herein have recognized the above disadvantages of the prior art and the need to improve the electric generation efficiency on the switched reluctance motor.

SUMMARY

Accordingly, there is provided, in one aspect of the present description, an electric machine comprising a rotational shaft, a rotor arranged coaxially with the shaft and having a plurality of salient poles which are arranged substantially equally spaced with each other in the circumferential direction, and a stator stationally arranged around said rotor and having a plurality of salient poles which are substantially equally spaced with each other and have thereon stator coils to be sequentially supplied with electricity for generating torque on the rotor. The electric machine further comprises a magnetizing member which is arranged on the shaft and offset from the rotor in the axial direction and capable of generating a magnetic field on the rotor to induce alternating magnetic flux on the stator coils when the magnetized rotor is rotated for generating electricity from the stator coils.

According to this electric machine, for generating torque, for example, for driving an automotive vehicle, electricity is sequentially supplied to the stator coils to pull the rotor salient poles in the circumferential direction. For generating electricity, the rotor is rotated, for example by rotation of driving wheels of the automotive vehicle such as in deceleration, and a magnetic field may be generated on the magnetizing member. The generated magnetic field may be conducted to the salient poles of the rotating rotor to induce the alternating magnetic flux on the stator coils. Consequently, the induced alternating magnetic flux generates electricity on the stator coils.

Therefore, the generated magnetic field on the stator may be conducted from the magnetizing member through the rotor salient poles to the stator salient poles. Consequently, the generated magnetic field does not change its configuration when the rotor rotates except for distances between the closest pairs of rotor salient poles and stator salient poles. Since both of the salient poles and stator poles are arranged substantially equally spaced, the magnetic flux on the stator coils just normally alternates. It does not cause any noise so that it may improve efficiency of electric generation.

Strength of the magnetic field generated in and conducted from the magnetizing member to the rotor may be adjusted, such as by adjusting electricity supplied to a coil arranged on the magnetizing member or by adjusting an axial position of the magnetizing member to the rotor. It may adjust amplitude of the magnetic flux on the stator coils so that output of the generated electricity may be controlled. The capability of the control on the output of the generated electricity may be particularly advantageous in automotive applications for such as an electric vehicle or a hybrid electric vehicle, because it may be hard to adjust rotational speed of the rotor due to mechanical constrains such as a direct coupling of the rotor to an engine or a drive shaft. Another reason of the advantage is that a battery may not be charged any more.

The magnetizing member may comprise a central portion, and a peripheral portion extending from the central portion in the radial direction. Then, the central portion and the central portion may be conductive respectively with the rotor and the stator. By this arrangement, the generated magnetic field may be shaped a closed loop from the magnetizing member through the rotor and the stator again to the magnetizing member. The generated magnetic field may be stabilized due to its closed loop shape.

There is provided, in another aspect of the present description, an electric machine comprising a rotational shaft, a rotor arranged coaxially with the shaft and having a plurality of salient poles which are substantially equally spaced with each other in the circumferential direction, an electric generation member which is arranged on the shaft and offset from the rotor in the axial direction and has an electric generation coil thereon, and a stator stationally arranged around the rotor and having a plurality of salient poles which are substantially equally spaced with each other and have thereon stator coils. For generating torque, electricity is sequentially supplied to the stator coils. For generating electricity, the rotor is rotated, for example by rotation of driving wheels of the automotive vehicle such as in deceleration, and electricity is supplied on the stator coils to generate a magnetic field on the salient poles of the stator. The generated magnetic field may be conducted to the salient poles of the rotating rotor to induce alternating magnetic flux passing through the electric generation coil.

In accordance with the electric machine, the magnetic field may be generated on and conducted from the stator salient poles through the rotor salient poles to electric generation coil. The generated magnetic field does not change its configuration when the rotor rotates except for distances between the closest pairs of rotor salient poles and stator salient poles. Since both of the salient poles and stator poles are arranged equally spaced, the magnetic flux conducted to the electric generation coil just normally alternates. It may not cause any noise so that it may improve efficiency of electric generation.

The magnetic field strength generated on the stator coils may be adjusted by adjusting electricity supplied to the stator coils. It may adjust amplitude of the magnetic flux on the electric generation coil so that output of the generated electricity may be controlled. It is beneficial particularly for the electric vehicle or the hybrid electric vehicle applications as described above.

The electric generation coil may be arranged on an electric generation member which is arranged on the shaft and offset from the rotor in the axial direction. The electric generation member may comprise a cylindrical central portion on whose outer surface the electric generation coil is arranged. It may further comprise a peripheral portion extending the said central portion in the radial direction. Then, the central portion and the peripheral portion may be conductive respectively with the rotor and the stator. By this arrangement, the generated magnetic field may be shaped a closed loop from the stator through the rotor and the electric generation coil again to the stator. The generated magnetic field may be stabilized due to its closed loop shape.

BRIEF DESCRIPTION OF THE DRAWINGS

The advantages described herein will be more fully understood by reading an example of embodiments in which the above aspects are used to advantage, referred to herein as the Detailed Description, with reference to the drawings wherein.

DETAILED DESCRIPTION

Figure 1:
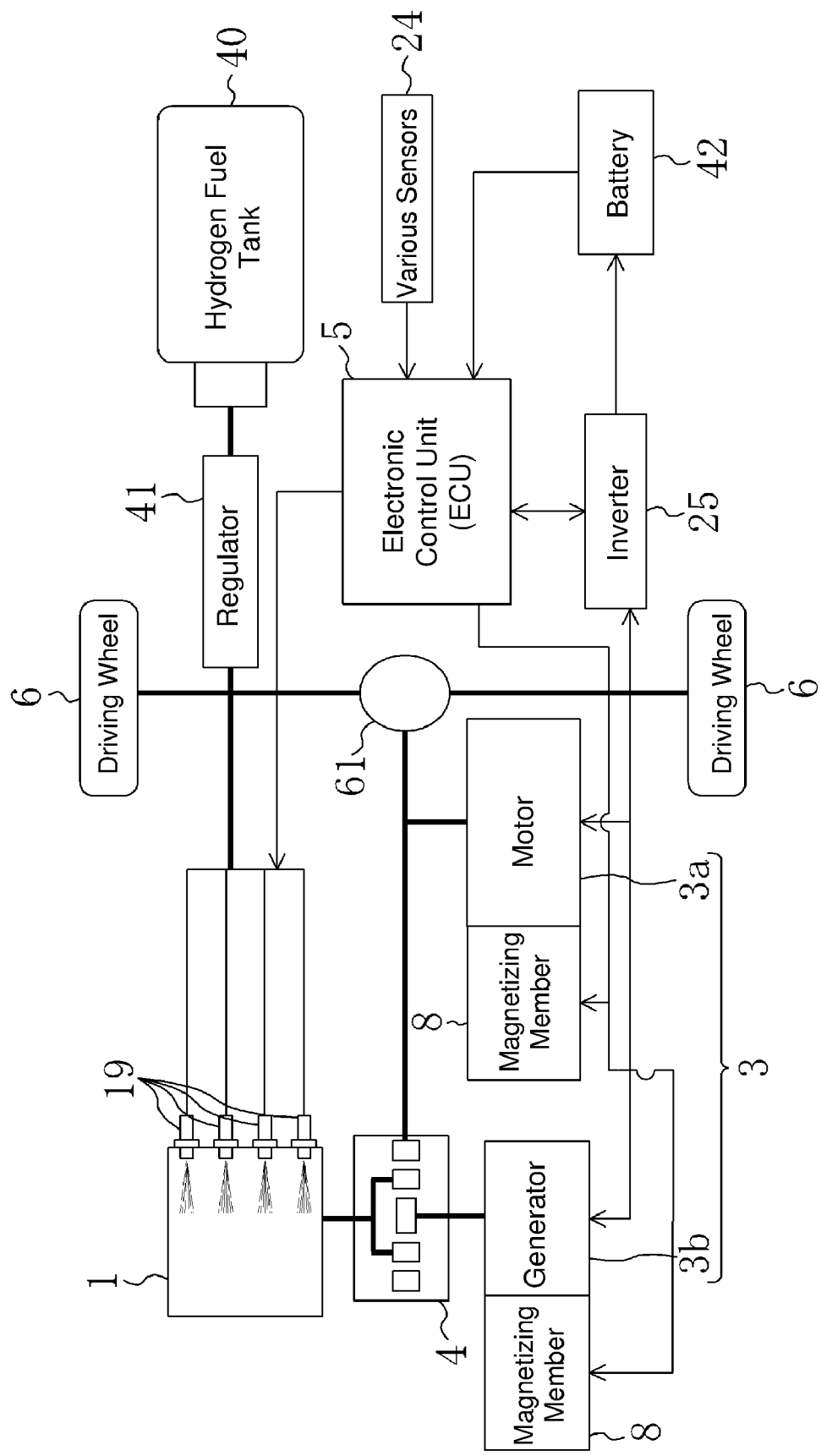
FIG. 1 is a schematic diagram of a hybrid electric vehicle according an embodiment of the present description.

The embodiment of the present description will now be described with reference to the drawings starting with FIG. 1, which shows a configuration of a drive-train of an automotive vehicle. The automotive vehicle is a hybrid electric vehicle (HEV) having an internal combustion engine 1 and a motor 3a as a power source by combining both of the engine 1 and motor 3. This HEV is a so called series parallel type, in which a crankshaft or output shaft of the engine 1 is coupled with the motor 3a and a generator 3b through a power split mechanism 4. The motor 3a is coupled to driving wheels 6 through a differential mechanism (differential gear) 61.

Electronic control unit (ECU) 5 controls the engine 1, the motor 3a and the generator 3b so that output from the engine 1 is appropriately split by the power split mechanism 4 and transmitted to the generator 3b and the driving wheels 6 (motor 3a).

The engine 1 illustrated in this embodiment is fueled with hydrogen, although any type of fuel may be used including gasoline and diesel fuel in the context of the present description. Fuel injectors 19 are connected to a hydrogen fuel tank 40 through a regulator 41. The hydrogen fuel tank 40 in this embodiment is a high pressure container storing hydrogen in a gaseous state. In a hydrogen fuel supply system between the hydrogen fuel tank 40 and the respective injectors 19, the regulator 41 depressurizes the high pressure hydrogen gas to a predetermined pressure appropriate for the injectors 19. The ECU 5 controls an opening duration of the injector 19 corresponding to a required amount of fuel under the predetermined pressure.

The engine 1 may be any type of engine including a gasoline engine, a diesel engine and a rotary piston engine in the context of the present description.

The crankshaft of the engine 1 is coupled to the motor 3a and the generator 3b through the power split mechanism 4. The motor 3a and the generator 3b are able to switch their functions between torque generation (as a motor) and electric generation (as a generator) depending on a situation. However, in common driving conditions, the motor 3a mainly outputs mechanical power to supplement the power from the engine 2, while the generator 3b generates electricity by using a part of the power output from the engine 2. Both of the motor 3a and generator 3b in this embodiment are switched reluctance motors 3, and details of their configuration will be described later.

The power split mechanism 4 comprises a planetary gear set having a sun gear, a ring gear and a planetary carrier. The sun gear is connected to the generator 3b, the ring gear to the motor 3a and the planetary carrier to the engine 1 respectively.

The motor 3a and the generator 3b are electrically connected to a battery 42 through an inverter 25. The generator 3b charges the battery 42 with electricity it generates, while motor 3b rotates using electricity stored in the battery 42.

The ECU 5 receives signals from various sensors 24 and a signal indicating a state of charge of the battery 42. The ECU determines a vehicle driving condition based on these signals and controls the engine 1, the motor 3a and the generator 3b based on the determined driving condition. Specifically the ECU 5 controls fuel injection amount of the respective cylinders of the engine 1 by adjusting opening period of the injector 19 depending on the driving condition. It may also adjust an ignition timing in a case of spark ignition engine. The ECU 5 adjusts electric current flowing between the motor 3a and the battery 42 and electric current flowing between the generator 3b and the battery 42 to control output or rotational speed of the motor 3a and an electric generation amount or rotational speed of the generator 3b.

In low load and speed region of operation, operating efficiency of the engine 1 will be lower, so the engine 1 will be shut off and only the motor 3a will drive the driving wheels 6. On the other hand, during normal driving region beyond the low load and speed region, the engine 1 is running and a portion of its output power is transmitted to driving wheels 6 through the power split mechanism 4. Another portion of the engine output is transmitted to the generator 3b through the power split mechanism 4 to generate electricity. The electricity from the generator 3b is supplied to the motor 3a to generate output power supplemented to the output power from the engine 1. In other words, the portion of the engine output is converted to electric power at the generator 3b and then again to mechanical power at the motor 3a and then supplemented back to the engine output so that ideally the engine output is fully transmitted to the driving wheels, resulting to a function of an electric continuous variable transmission achieved. It enables the engine 1 to be operated in an operating region with higher operating efficiency.

When decelerating the vehicle, the motor 3a may be operated as a generator to brake the driving wheels 6 and generate electricity, which is so called regenerative braking. On the other hand, the generator 3b is operated basically as an electric generator and may be operated as a motor in a limited occasion.

Note that the ECU 5 will operate the engine 1 even in a lower load region to shut off an operation of the engine 1 if a state of charge of the battery 42 is not sufficient or if a compressor of air conditioning is operated.

The ECU 5 also determines required electricity from the generator 3b depending on the various input signals and controls the generator 3b to generate electricity depending on the required electricity.

Figure 2:
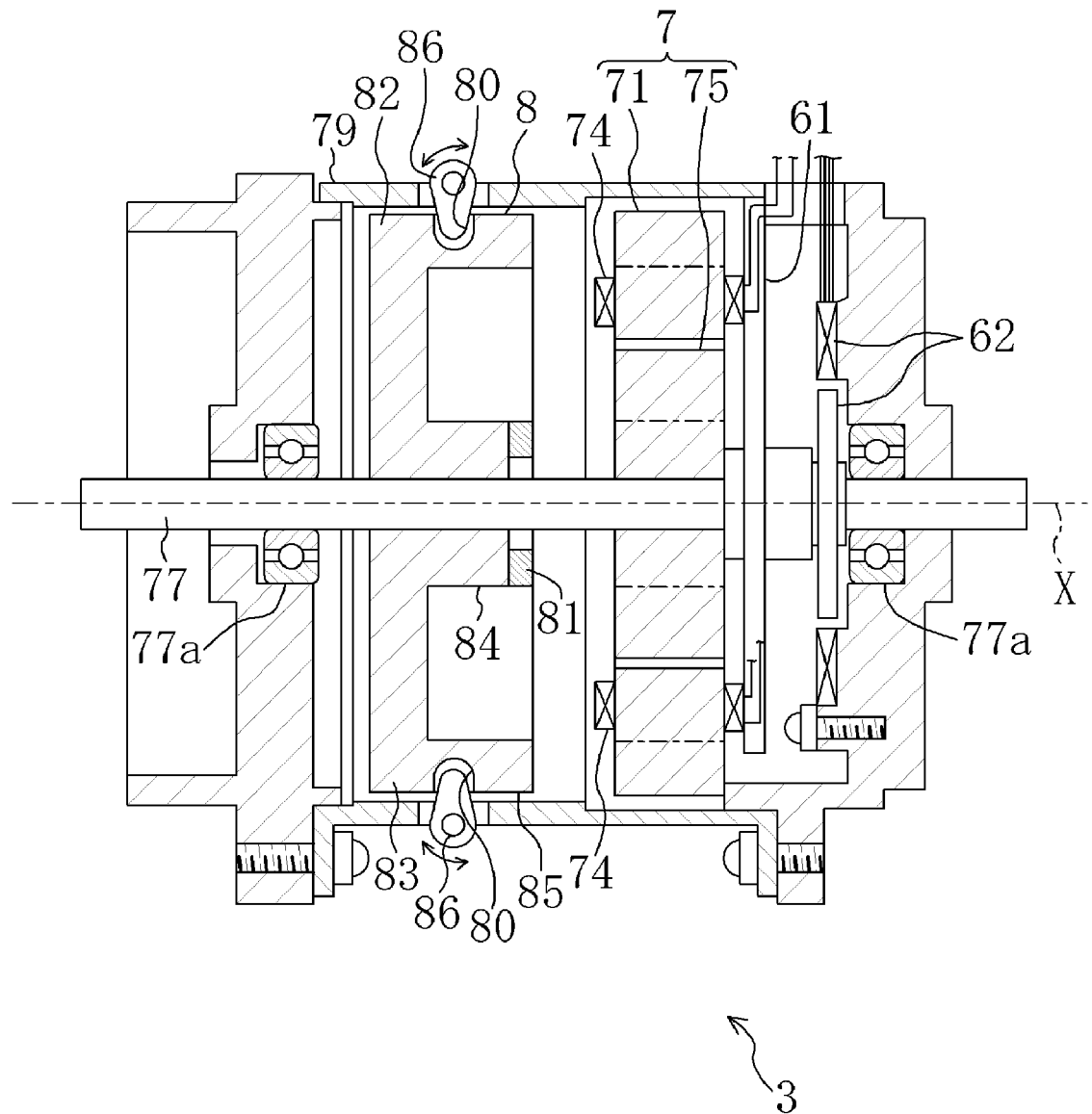
FIG. 2 is a cross sectional view along a rotational axis of a switched reluctance motor according to the embodiment.
Figure 3:
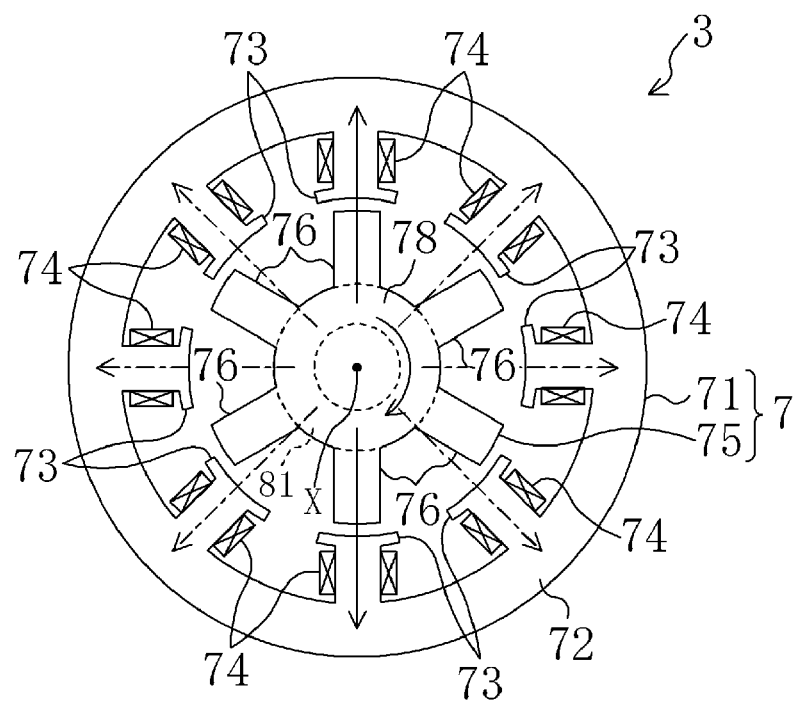
FIG. 3 is a plain view showing a portion of the switched reluctance motor including a stator and a rotor according to the embodiment.
Figure 4:
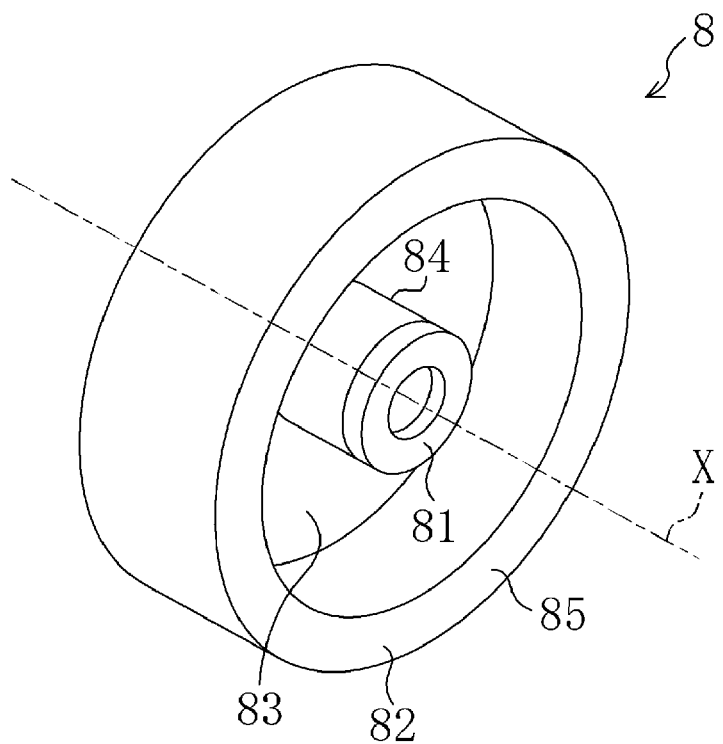
FIG. 4 is a perspective view showing a magnetizing member of the switched reluctance motor according to the embodiment.

Details of the motor 3a and generator 3b will be described with reference to FIGS. 2 through 4. The motor 3a and generator 3b are, as described above, switched reluctance motors, which are hereafter referred collectively to as electric machines.

The electric machine 3 comprises a motor body 7 consisting of a stator 71 and a rotor 75 arranged coaxially with each other, and a magnetizing member 8 to generate a magnetic field.

The stator 71 comprises a cylindrical yoke 72 which has its center at an axis X. It also comprises a plurality (eight pieces in the embodiment) of stator salient poles 73 protruding inwardly in the radial direction of the yoke 72. The stator salient poles 73 are arranged equally spaced with each other in the circumferential direction. Coils 74 are winded around the respective stator salient poles 73. The coils 74 facing each other over the axis X in the radial direction are electrically connected in series with each other.

The rotor 75 comprises a disc shaped core 78 and a plurality (six pieces in the embodiment) of rotor salient poles 76 protruding outwardly in the radial direction the core 78. The plurality of rotor salient poles 76 is arranged equally angularly spaced. The rotor 75 is outfitted to a shaft 77 which is an output shaft. It rotates around the axis X integrally with the shaft 77.

The stator 71 and rotor 75 are accommodated in a housing 79. The stator 71 is fixed in the motor housing 79, while the rotor 75 can rotate around the axis X which is coaxial with a center axis of the stator 71. The shaft 77 is supported by bearings 77a. The stator 71 and rotor 75 are both made from electromagnetically conductive material.

Terminal plates 61 draw ends of the coils 74 of the stator salient poles 73 out of the motor housing 79. A rotational angle sensor 62 detects a rotational angle of the shaft 77.

The magnetizing member 8 is arranged offset from the stator 71 and the rotor 75 in the direction of the axis X. The shaft 77 penetrates the magnetizing member 8. The magnetizing member 8 is slidably supported on the shaft 77.

The magnetizing member 8 comprises a permanent magnet 81 and a yoke 82 made from electromagnetically conductive material. The yoke 82 comprises a disk portion 83, a cylindrical central portion 84 and a cylindrical peripheral portion 85. The central portion 84 protrudes from a center of the disk portion 83 toward the rotor 75. The shaft 77 penetrates the central portion 84 through a hole formed at its center. The disk portion 83, central portion 84 and peripheral portion 85 are all arranged axis-symmetrically with respect to the shaft 77 on the rotational axis X. The permanent magnet 81 is ring shaped and attached to an end of the central portion 84 at the side of the rotor 75, as shown in FIG. 4.

A plurality of concaves 80 are formed on an outer surface of peripheral portion 82 of the magnetizing member 8, while cams 86 are provided on the housing 79. The cams 86 engage the concaves 80 and swing to slide the magnetizing member 8 on the shaft 77, so that the magnetizing member 8 can slide between the closest position to the motor body 7 and the furthest position from the motor body 7. The swinging motion of the cams 86 are operated by an actuator not illustrated, which is controlled by the ECU 5.

Figure 5:
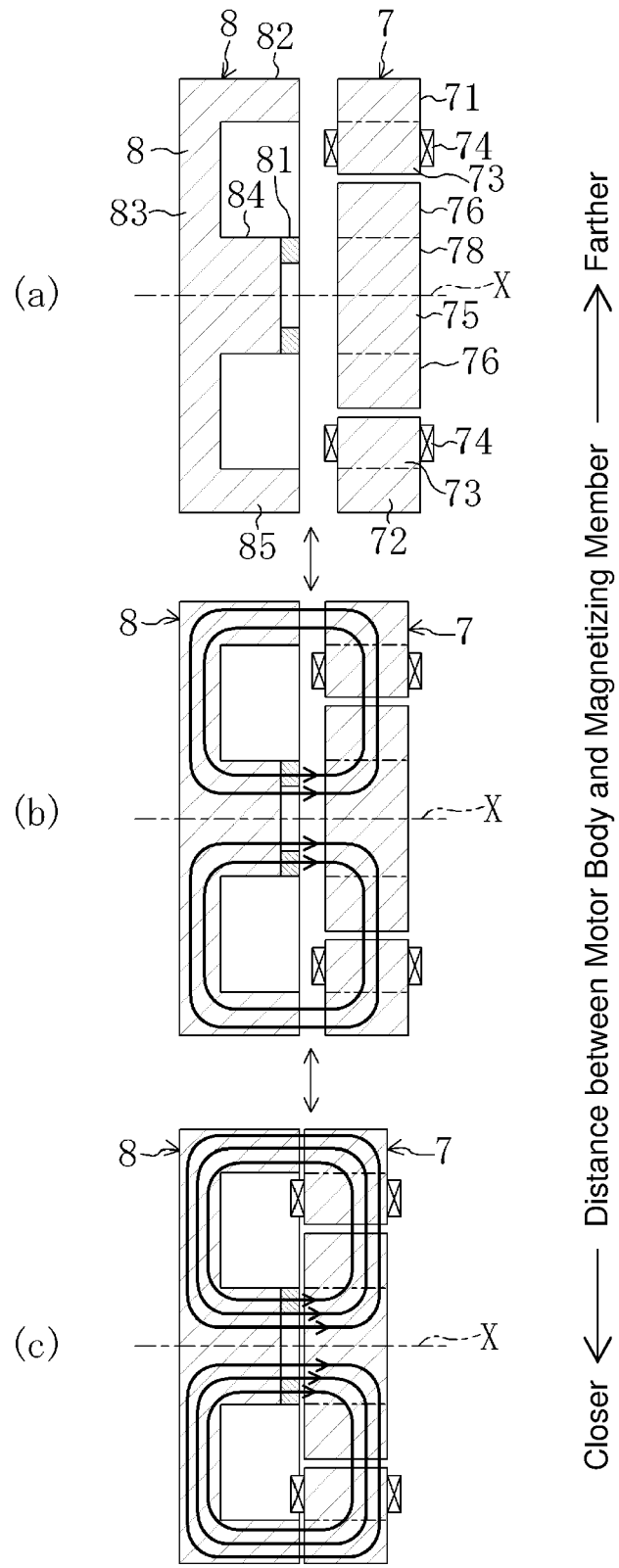
FIG. 5 is a diagram illustrating a relationship between a relative position of the magnetizing member to the rotor and the stator and a magnetic field passing through the magnetizing member, the rotor and the stator, in accordance with the embodiment.

Operation of the electric machine 3 will now be described. To generate torque from the electric machine 3, the magnetizing member 8 is positioned at the furthest position from the motor body 7 as shown in FIG. 5(a). Then, the permanent magnet 81 of the magnetizing member 8 does not generate on motor body 7, specifically the rotor 75. The space between the magnetic field forming member 8 and the motor body 7 may be set so that a magnetic field by the permanent magnet is not formed.

On the other hand, like a conventional switched reluctance motor, electricity is sequentially carried on the coils 74 of the respective stator salient poles 73 based on a rotational angle detected by the rotational angle sensor 62. That is, electricity is carried on a pair of coils 74 of stator salient poles 73 facing each other in the radial direction to induce magnetic flux from the stator salient poles 73 to the rotor salient poles 76. The induced magnetic flux pulls a pair of the rotor salient poles 76 toward the respective stator salient poles 73. When the pair of stator salient poles 73 and the pair of rotor salient poles 76 are in alignment, the other poles 73 and 76 are out of alignment. Therefore, by sequentially carrying electricity on a pair of the stator salient poles 73 which are out of alignment from a pair of the rotor salient poles 76, a pair of rotor salient poles 76 are continuously pulled to a pair of the stator salient poles 73 so that torque is generated on the shaft 77 and the rotor 75 can be rotated around the rotational axis X. That is, at a time of generating torque from the electric machine 3, the coils 74 of the stator salient poles 73 are functioned as magnetic field coils.

Figure 6:
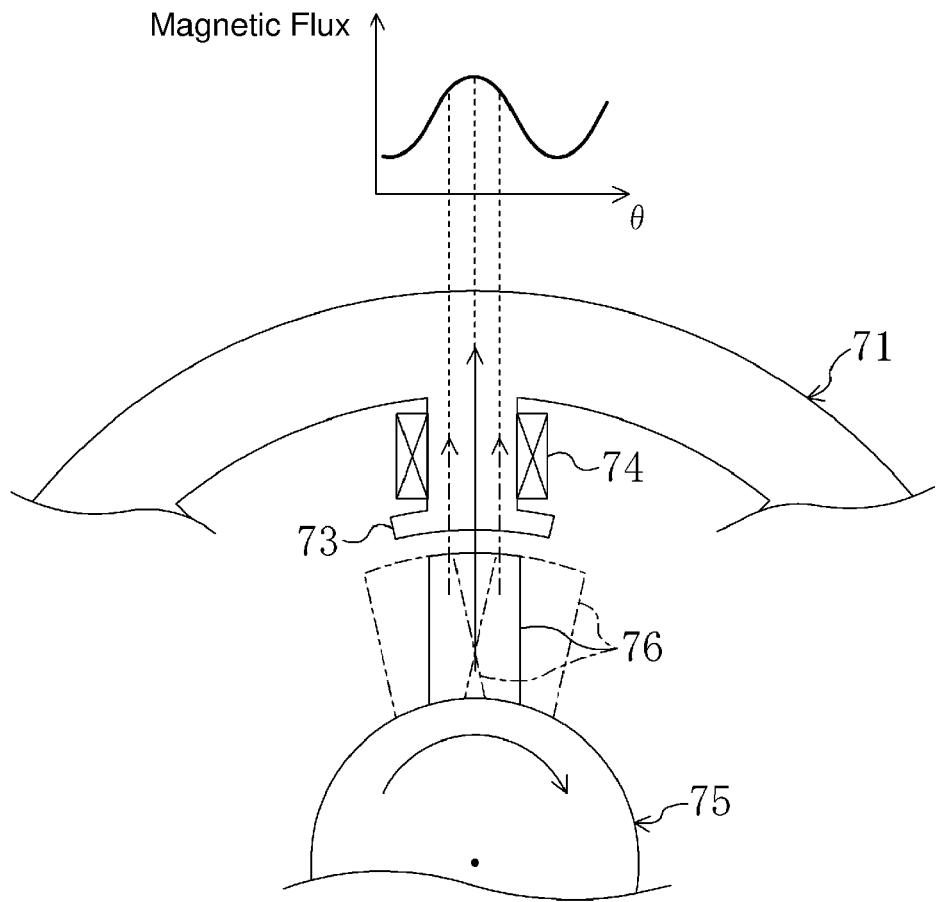
FIG. 6 is a diagram illustrating alternating magnetic flux induced on the stator coil by a rotation of the rotor according to the embodiment.

To generate electricity from the electric machine 3, the magnetizing member 8 is positioned closer to the motor body 7 as shown in FIGS. 5(b) or (c), where the permanent magnet 81 generates a magnetic field at least in the rotor 75. The generated magnetic field induces magnetic flux extending in the radial direction from the rotor salient pole 76 through the stator salient pole 73 and the stator coil 74, as shown in FIG. 3 (see arrows of solid line or one-dotted line). The generated magnetic field passes through the rotor 75, the stator 76 and the magnetizing member 82 to form a closed loop as shown in FIGS. 5(b) or (c). Then, in the respective stator salient poles 73, as shown in FIG. 6, the induced magnetic flux changes in sinusoidal wave shape according to the rotational angle θ of the rotor 75, thereby to generate electromotive force in the coils of the respective stator salient poles. That is, at a time of generating electricity, the stator coil 74 is functioned as an electric generation coil.

Figure 7:
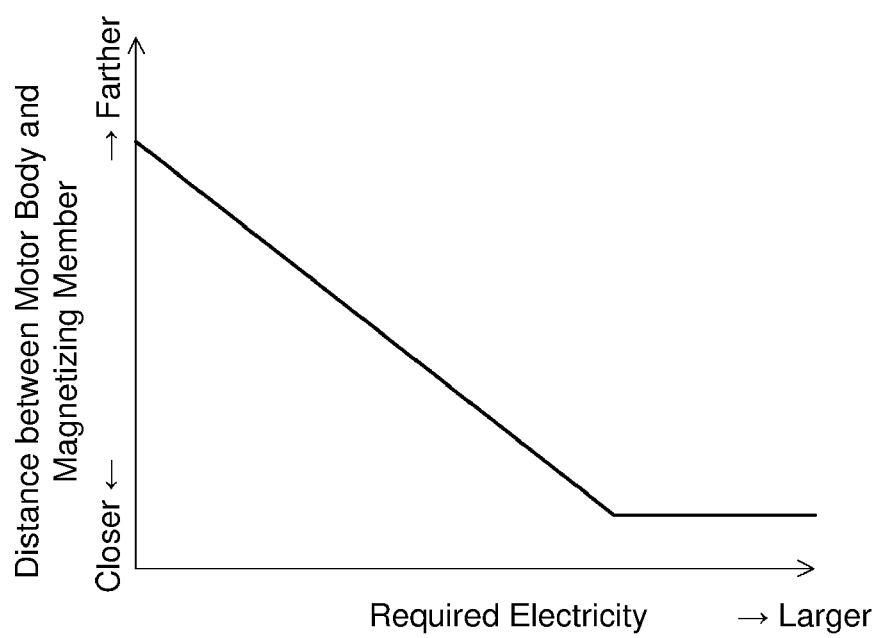
FIG. 7 is a graph showing a relationship between an electric generation amount and a distance between the magnetizing member and the rotor and the stator according to the embodiment.
Figure 8:
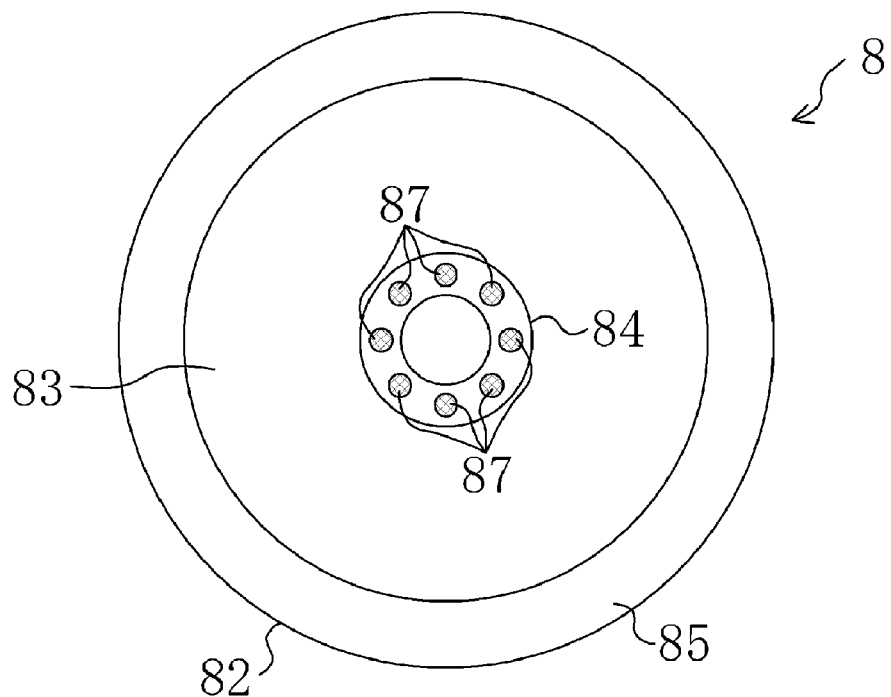
FIG. 8 is a plain view showing a second example of the magnetizing member according to the present embodiment.

When the electric machine 3 generates electricity, the ECU 5 controls a relative position of the magnetizing member to the motor body 7 (stator 71 and rotor 75) depending on a required electricity to be generated. This is, for example, done based on a map such as shown in FIG. 7. A distance between the motor body 7 and the magnetizing member 8 is smaller as the required electricity is larger. Then the magnetizing member 8 is positioned closest to the motor body 7 when the required electricity is more than a certain amount. Thereby, as the required electricity is larger, the magnetic field strength is larger (FIG. 5(c)), and on the contrary, as the required electricity is smaller, the magnetic field strength is smaller (FIG. 5(b)). As such, by changing the magnetic field strength depending on the required electricity, electric generation depending on the required electricity can be efficiently performed, which can prevent overcharge of the battery 42.

The magnetic flux induced at the respective stator salient poles 73 changes its density at different phases with each other as the rotor 75 rotates so that electric currents recovered by the respective stator coils 74 have different phases with each other. However the magnetic field strength generated by the motor body 7 and the magnetizing member 8 is consistent between the plurality of stator salient poles 73. When combining the electric currents recovered by the respective stator coils 74, there is less noise in the combined electric current, so that the electric generation efficiency can be improved.

Since the electric machine 3 forms a magnetic field for electric generation by means of the permanent magnet 81, electric power to form a magnetic field is not necessary so that electric power recovery ratio can be improved.

When the electric machine 3 is not required to generate electricity, the magnetizing member 8 is positioned furthest from the motor body 7 as shown in FIG. 5(a) so that magnetic field by the permanent magnet 81 is not formed in the motor body 7, in other words, the stator 71 or the rotor 75. Because of it as well as because the rotor 75 has no permanent magnet, the electric machine 3 will not generate electricity when not required. Accordingly, there is no need of providing a clutch for disengaging the motor 3a from the driving wheels 6.

If a motor has a permanent magnet on a rotor, a counter electromotive force will always arise at stator coils when the rotor rotates. The counter electromotive force will be larger at a higher rotational speed, which may possibly damage the stator coil. It also may saturate a magnetic field generated by electric current in the stator coils so that torque can not be generated at the rotor. However, the electric machine 3 of this embodiment does not have a permanent magnet on the rotor 75 so that the counter electromotive force does not become large so that the electric machine 3 can generate torque even at a high speed. So the electric machine 3 is appropriate to be used as a driving motor in a situation where a vehicle speed and a motor speed are proportional, particularly as the motor 3b in the HEV drive-train shown in FIG. 1.

Figure 9:
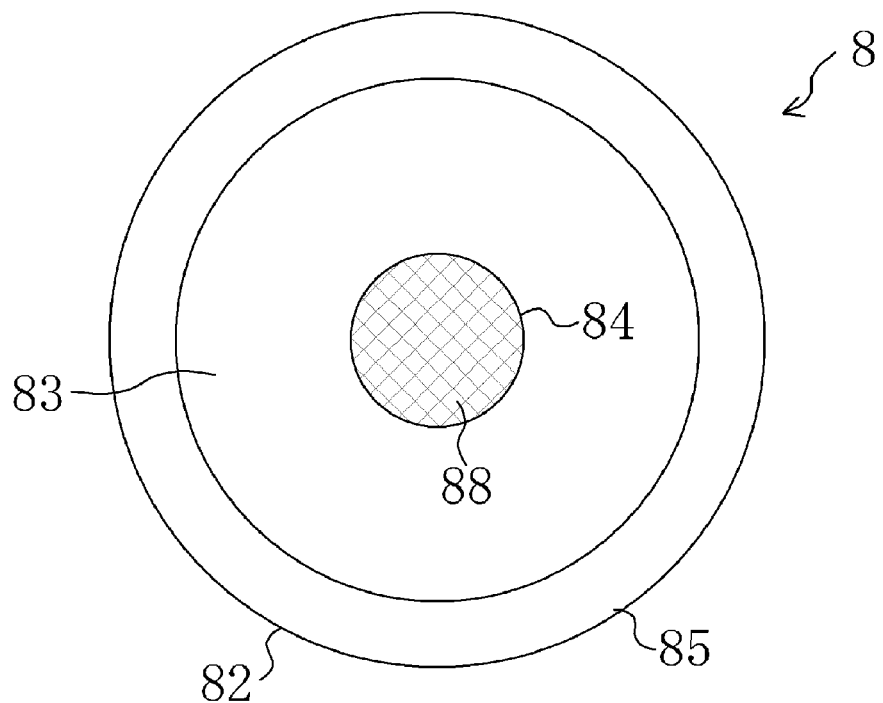
FIG. 9 is a plain view showing a third example of the magnetizing member according to the present embodiment.

Although in the above embodiment the permanent magnet 81 on the magnetizing member 8 is ring shaped, a plurality of permanent magnets 87 may be arranged at the end of the central portion 84 at angular positions corresponding to the stator salient poles 73. Also, as shown in FIG. 9, a disc shaped permanent magnet 88 may be arranged at the end of the central portion 84. In this case, however, the shaft 7 may not be arranged penetrating the magnetic field forming member 8.

An electric machine 3 according to a second embodiment will now be described. The second embodiment is different from the first embodiment on that the magnetizing member 8 has a magnetic field coil 89 instead of the permanent magnet of the first embodiment. The magnetic field coil 89 is arranged on the central portion 84 of the magnetizing member 8. The magnetizing member 8 in the second embodiment is fixed in the axial direction as well as the circumferential direction. In other words, it does not axially slide as the first embodiment does. So, it is permanently positioned closest to the motor body 7 (stator 71 and rotor 75). Since other configurations of the electric machine 3 of the second embodiment are the same as those of the first embodiment, same reference numeral is put for a same part and its detailed description for that will be omitted.

Operation of the electric machine 3 according to the second embodiment will now be described. The ECU 5 controls electricity to be carried on the magnetic field coil 89 of the magnetizing member 8. To generate torque from the electric machine 3, electricity is not carried on the magnetic field coil 89 so that the magnetizing member 8 does not generate a magnetic field on the motor body 7.

On the other hand, like a conventional switched reluctance motor, electricity is sequentially carried on the coils 74 of the respective stator salient poles 73 based on a rotational angle detected by the rotational angle sensor 62. That is, at a time of generating torque from the electric machine 3, the coils 74 of the stator salient poles 73 are functioned as magnetic field coils, as described above in terms of the first embodiment.

Figure 10:
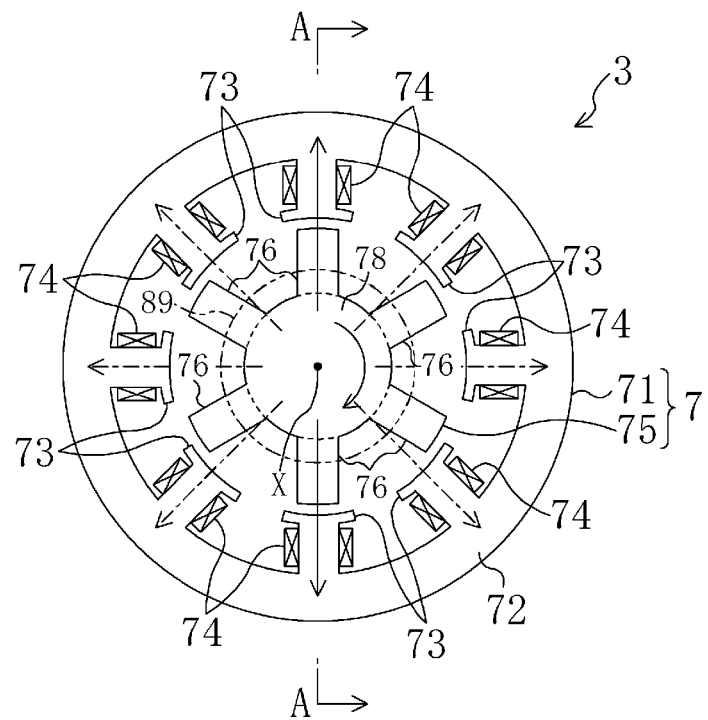
FIG. 10 is a plain view showing a portion of a switched reluctance motor including a stator and a rotor according to a second embodiment of the present description.
Figure 11:
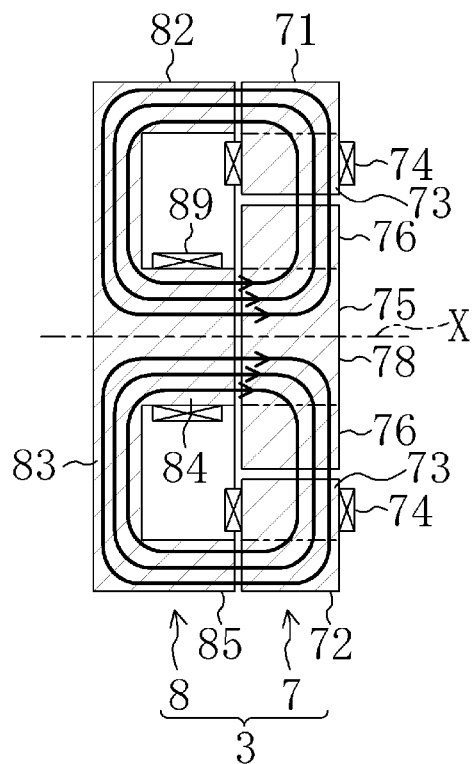
FIG. 11 is a cross sectional view along a line A-A of FIG. 10.

To generate electricity from the electric machine 3, electricity is constantly carried on the magnetic field coil 89 on the magnetizing member 8 to generate a magnetic field at least in the rotor 75. The generated magnetic field induces magnetic flux extending in the radial direction from the rotor salient pole 76 through the stator salient pole 73 and the stator coil 74, as shown in FIG. 10 (see arrows of solid line or one-dotted line). The generated magnetic field passes through the rotor 75, the stator 76 and the magnetizing member 82 to form a closed loop as shown in FIG. 11. That is, at a time of generating electricity, the stator coil 74 is functioned as an electric generation coil.

Figure 12:
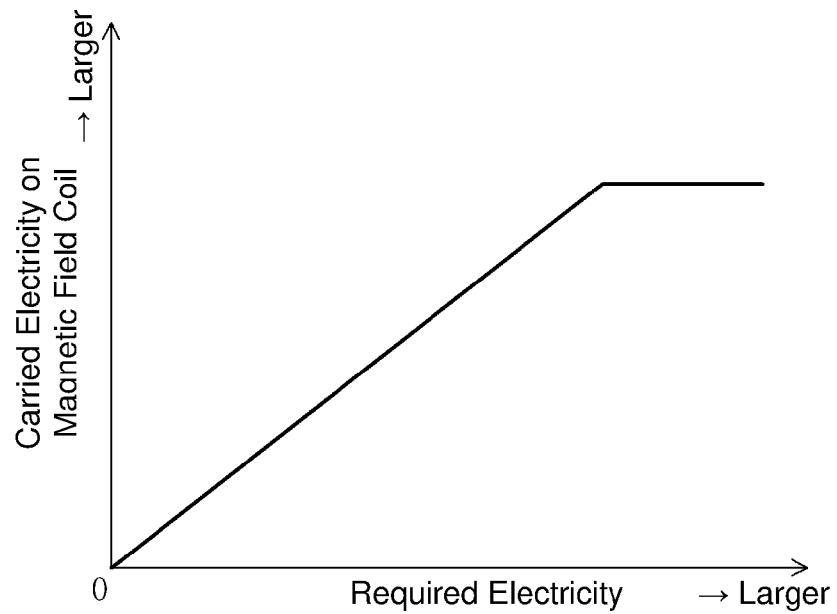
FIG. 12 is a graph showing a relationship between an electric generation amount and electricity supplied to the magnetizing member according to the second embodiment.
Figure 13:
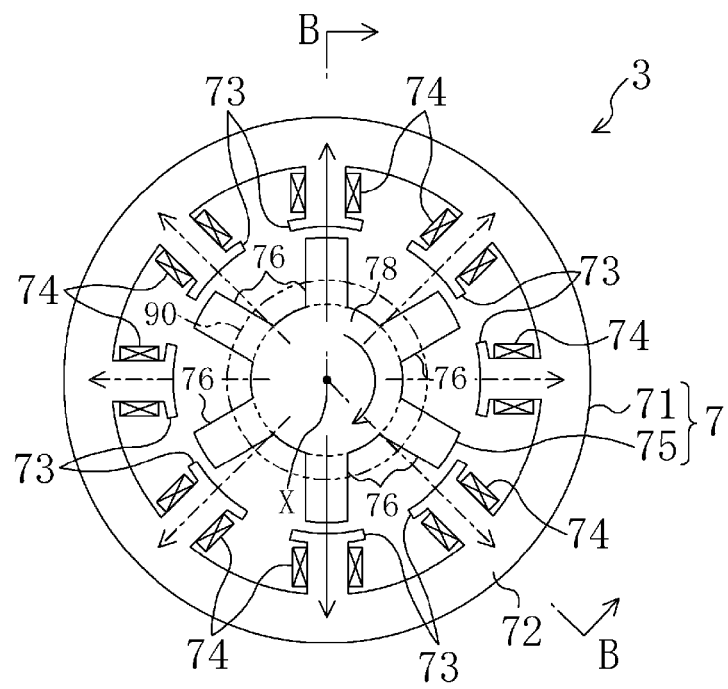
FIG. 13 is a plain view showing a portion of a switched reluctance motor including a stator and a rotor according to a third embodiment of the present description.

When the electric machine 3 generates electricity, the ECU 5 controls electricity to be carried on the magnetic field coil 89 depending on a required electricity to be generated. This is, for example, done based on a map such as shown in FIG. 12. Electricity to be carried on the magnetic field coil is increase as the required electricity is larger. Thereby, as the required electricity is larger, the magnetic field strength is larger, and on the contrary, as the required electricity is smaller, the magnetic field strength is smaller. As such, by changing the magnetic field strength depending on the required electricity, electric generation depending on the required electricity can be efficiently performed.

The magnetic field strength generated by the motor body 7 and the magnetizing member 8 is consistent between the plurality of stator salient poles 73. When combining the electric currents recovered by the respective stator coils 74, there is less noise in the combined electric current, so that the electric generation efficiency can be improved.

When the electric machine 3 is not required to generate electricity, electricity is not carried on the magnetic field coil 89 so as not to generate electricity. Accordingly, there is no need of providing a clutch for disengaging the motor 3a from the driving wheels 6.

An electric machine 3 according to a third embodiment will now be described. It has a similar configuration that of the second embodiment, except that there is an electric generation coil 90 instead of the magnetic field coil of the second embodiment on the magnetizing member. The electric generation coil 90 is arranged on the central portion 84 of the magnetizing member 8 (referred to as electric generation coil holding member only in the context of the third embodiment). The electric generation coil holding member 8 in the third embodiment is fixed in the axial direction as well as the circumferential direction, like the magnetizing member in the second embodiment. In other words, it does not axially slide as the first embodiment does. So, it is permanently positioned closest to the motor body 7 (stator 71 and rotor 75). Since other configurations of the electric machine 3 of the second embodiment are the same as those of the first embodiment, same reference numeral is put for a same part and its detailed description for that will be omitted.

Operation of the electric machine 3 according to the third embodiment will now be described. To generate torque from the electric machine 3, like a conventional switched reluctance motor, electricity is sequentially carried on the coils 74 of the respective stator salient poles 73 based on a rotational angle detected by the rotational angle sensor 62. That is, at a time of generating torque from the electric machine 3, the coils 74 of the stator salient poles 73 are functioned as magnetic field coils also in the third embodiment.

Figure 14:
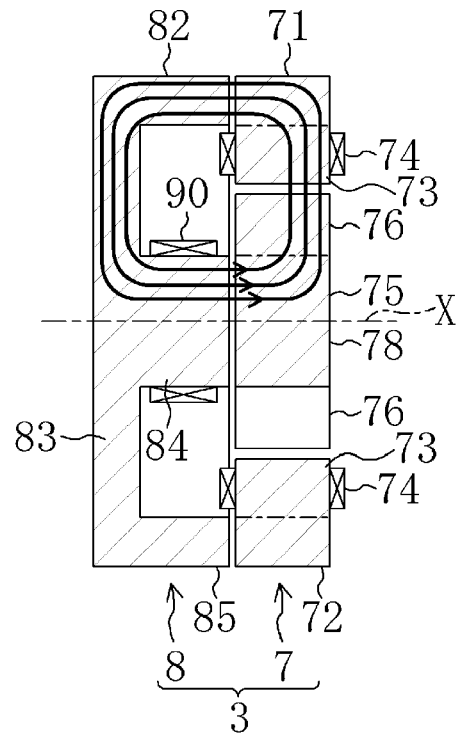
FIG. 14 is a cross sectional view along a line B-B of FIG. 13.
Figure 15:
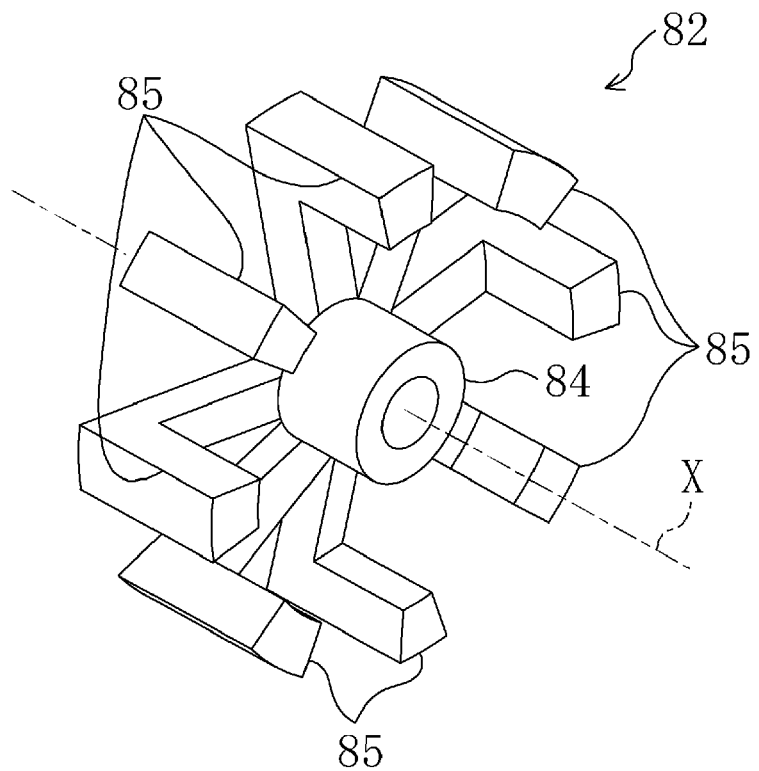
FIG. 15 is a perspective view showing another example of the magnetizing member according the embodiments.

In the third embodiment, even to generate electricity from the electric machine 3, electricity is continuously carried on the all stator coils 74. Thereby magnetic fields are generated at least in the stator salient poles 73. The generated magnetic field induces magnetic flux extending in the radial direction from the stator salient pole 73 through the rotor salient pole 73 then in the axial direction through the electric generation coil 90. The generated magnetic field passes through the rotor 75, the stator 76 and the electric generation coil holding member 82 to form a closed loop as shown in FIG. 14. Therefore, the magnetic field strength varies in a sinusoidal wave shape as the rotor 75 rotates, so that electromotive force arises on the electric generation coil 90.

When the electric machine 3 generates electricity, the ECU 5 controls electricity to be carried on the stator coils 74 depending on a required electricity to be generated. This is, for example, done based on a map such as shown in FIG. 12. Electricity to be carried on the stator coils is increase as the required electricity is larger. Thereby, as the required electricity is larger, the magnetic field strength is larger, and on the contrary, as the required electricity is smaller, the magnetic field strength is smaller. As such, by changing the magnetic field strength depending on the required electricity, electric generation depending on the required electricity can be efficiently performed.

The magnetic field strength generated at the respective stator salient poles 73 is consistent between the respective stator coils 74. When combining the electric currents recovered by the electric generation coil 90, there is less noise in the combined electric current, so that the electric generation efficiency can be improved.

Since the electric generation coil is one, the process to combine electricity recovered from the plurality of coils as in the first and second embodiments is not required.

When the electric machine 3 is not required to generate electricity, electricity is not carried on the magnetic field coil 89 so as not to generate electricity. Accordingly, there is no need of providing a clutch for disengaging the motor 3a from the driving wheels 6.

Although the yokes 82 of the magnetizing or electric generation coil holding members 3 according to the above embodiments comprise the disc portion 83 and the peripheral portion 85, it may be formed to be in so-called basket shape. Specifically, portions corresponding to the respective stator salient poles 73 are left and the other portions in the disc portion 83 and the peripheral portion 85 are cut off to form L-shaped rods extending in the radial direction then in the axial direction toward the motor body 3. Thereby, weight reduction of the electric machine 3 is achieved. Also, the disk portion may be left, and only the portions in the peripheral portion corresponding to the respective stator salient poles 73 may be cut off.

Although the electric machine 3 is used for a hybrid electric vehicle in the above embodiments, it may be used for other type of vehicles, such as an electric vehicle, a fuel cell vehicle. Further, the electric machine 3 is not limited to application of driving a vehicle. It can be used for other applications such as a starter/generator coupled with an engine.

It is needless to say that the invention is not limited to the illustrated embodiment and that various improvements and alternative designs are possible without departing from the substance of the invention as claimed in the attached claims.

The invention claimed is:

1. An electric machine comprising:
   a rotational shaft;
   a rotor arranged coaxially with said shaft and having a plurality of salient poles which are arranged substantially equally spaced with each other in the circumferential direction;
   a stator stationarily arranged around said rotor and having a plurality of salient poles which are substantially equally spaced with each other and have thereon stator coils to be sequentially supplied with electricity for generating torque on said rotor;
   a sensor sending a signal indicating a state of charge of a battery, wherein said signal is used to determine required electricity generated from said electric machine; and
   a magnetizing member which is arranged on said shaft and offset from said rotor in the axial direction and capable of generating a magnetic field on said rotor to induce alternating magnetic flux on said stator coils when said magnetized rotor is rotated for generating electricity from said stator coils so as to charge said battery with said electricity, wherein:
   said rotor has no permanent magnet; and
   said magnetizing member is adapted so that strength of the magnetic field on said rotor may be adjusted to be larger as said required electricity is larger and to be smaller as said required electricity is smaller.

2. The electric machine as described in claim 1, wherein said magnetizing member comprises a magnetizing coil to be supplied with electricity to induce the alternating magnetic flux on said stator coils for generating electricity from said stator coils.

3. The electric machine as described in claim 2, wherein said magnetizing member further comprises:
   a central portion; and
   a peripheral portion extending from said central portion in the radial direction;
   wherein said central portion and said peripheral portion are conductive respectively with said rotor and said stator to induce the alternating magnetic flux.

4. The electric machine as described in claim 3, wherein said central portion is a cylinder which is arranged coaxially with said rotational shaft and on whose outer surface said magnetizing coil is arranged.

5. The electric machine as described in claim 4, wherein said peripheral portion further comprises a disk extending outwardly from said central portion and a cylinder extending from said disk toward said stator in the axial direction.

6. The electric machine as described in claim 4, wherein said peripheral portion further comprises members extending outwardly from said central portion in the radial direction and then extending toward said stator in the axial direction.

7. The electric machine as described in claim 1, wherein said magnetizing member has a permanent magnet that can slide on said rotational shaft toward said rotor to induce the alternating magnetic flux for generating electricity from said stator coil.

8. The electric machine as described in claim 7, wherein said magnetizing member further comprises:
   a central portion; and
   a peripheral portion extending from said central portion in the radial direction;
   wherein said central portion and said peripheral portion are conductive respectively with said rotor and said stator for inducing the alternating magnetic flux.

9. The electric machine as described in claim 8, wherein said central portion is a cylinder which is arranged coaxially with said rotational shaft and provided thereon with said permanent magnet.

10. The electric machine as described in claim 9, wherein said permanent magnet has one pole face to said rotor and another pole face to said central portion.

11. The electric machine as described in claim 10, wherein said permanent magnet is shaped to be a ring attached to one side of said rotor and arranged around said rotational shaft.

12. The electric machine as described in claim 8, wherein said peripheral portion further comprises a disk extending outwardly from said central portion and a cylinder extending from said disk toward said stator in the axial direction.

13. The electric machine as described in claim 8, wherein said peripheral portion further comprises members extending outwardly from said central portion in the radial direction and then extending toward said stator in the axial direction.

14. The electric machine as described in claim 1, wherein said magnetizing member is adapted so that for generating torque from said electric machine, the strength of the magnetic field on said rotor may be adjusted to be smaller.

15. An electric machine comprising:
   a rotational shaft;
   a rotor arranged coaxially with said shaft and having a plurality of salient poles which are substantially equally spaced with each other in the circumferential direction;
   an electric generation member which is arranged on said shaft and offset from said rotor in the axial direction and has an electric generation coil thereon, wherein said rotor has no permanent magnet;
   a stator stationarily arranged around said rotor and having a plurality of salient poles which are substantially equally spaced with each other and have thereon stator coils; and
   a sensor sending a signal indicating a state of charge of a battery, wherein said signal is used to determine required electricity generated from said electric machine;
   wherein:
   in sequentially supplying said stator coils with electricity for generating torque on said rotor, and in constantly supplying at least some of said stator coils with electricity to induce alternating magnetic flux on said electric generation coil when said rotor is rotated for generating electricity from said electric generation coil so as to charge said battery with said electricity from said electric generation coil, said electricity supplied to said stator coils is adjusted to adjust strength of the magnetic field on said rotor so as to be larger as said required electricity is larger and so as to be smaller as said required electricity is smaller.

16. The electric machine as described in claim 15, wherein said electric generation member further comprises:
   a cylindrical central portion on whose outer surface said electric generation coil is arranged; and
   a peripheral portion extending from said central portion in the radial direction;
   wherein said central portion and said peripheral portion are conductive respectively with said rotor and said stator to induce the alternating magnetic flux.

17. A method of using an electric machine comprising:
   providing a sensor sending a signal indicating a state of charge of a battery, wherein said signal is used to determine required electricity generated from said electric machine;
   sequentially supplying electricity to stator coils on a plurality of salient poles of a stator arranged around a rotor having a plurality of salient poles to pull said rotor salient poles in the circumferential direction for generating torque on said rotor;
   rotating said rotor;
   generating a magnetic field on a magnetizing member which is arranged coaxially with said rotor and offset from said rotor in the axial direction, wherein said rotor has no permanent magnet;
   conducting the generated magnetic field to said salient poles of said rotating rotor to induce alternating magnetic flux;
   recovering electricity generated by the induced alternating magnetic flux from said stator coils so as to charge said battery; and
   adjusting strength of said magnetic field conducted from said magnetizing member to said rotor so as to be larger as said required electricity is larger and so as to be smaller as said required electricity is smaller, thereby adjusting amplitude of the magnetic flux induced on said stator coils to control output of the generated electricity.

18. The method as described in claim 17, further comprising adjusting electricity supplied to a coil arranged on said magnetizing member to adjust the magnetic field strength.

19. The method as described in claim 18, further comprising adjusting an axial position of said magnetizing member to said rotor to adjust the magnetic field strength.

20. A method of using an electric machine comprising:
   providing a sensor sending a signal indicating a state of charge of a battery, wherein said signal is used to determine a required electricity generated from said electric machine;
   sequentially supplying electricity to stator coils on a plurality of salient poles of a stator arranged around a rotor having a plurality of salient poles to pull said rotor salient poles in the circumferential direction for generating torque on said rotor;
   rotating said rotor;
   supplying electricity on said stator coils to generate a magnetic field on said salient poles of said stator;
   conducting the generated magnetic field to said salient poles of said rotating rotor to induce alternating magnetic flux passing through an electric generation coil arranged coaxially with said rotor, wherein said rotor has no permanent magnet;

recovering electricity generated by the induced alternating magnetic flux from said electric generation coil so as to charge said battery; and adjusting electricity supplied to said stator coils, thereby adjusting a strength of the magnetic field so as to be larger as said required electricity is larger and so as to be smaller as said required electricity is smaller to control output of the generated electricity.

* * * * *

UNITED STATES PATENT AND TRADEMARK OFFICE
CERTIFICATE OF CORRECTION

PATENT NO.        : 7,622,840 B2                                    Page 1 of 1
APPLICATION NO.   : 11/458954
DATED             : November 24, 2009
INVENTOR(S)       : Yonemori et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 672 days.

Signed and Sealed this

Twenty-sixth Day of October, 2010

David J. Kappos
*Director of the United States Patent and Trademark Office*